United States Patent
Schilling et al.

(10) Patent No.: US 10,823,170 B2
(45) Date of Patent: Nov. 3, 2020

(54) TRANSMISSION WITH DOUBLE-FLOW SLIDING VANE PUMP

(71) Applicant: ZF Friedrichshafen AG, Friedrichshafen (DE)

(72) Inventors: Carl Schilling, Weingarten (DE); Martin Brehmer, Tettnang (DE); Markus Gentner, Immenstaad (DE); Armin Thiele, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 249 days.

(21) Appl. No.: 15/956,838

(22) Filed: Apr. 19, 2018

(65) Prior Publication Data

US 2018/0306185 A1 Oct. 25, 2018

(30) Foreign Application Priority Data

Apr. 19, 2017 (DE) .................. 10 2017 206 576
Apr. 6, 2018 (DE) .................. 10 2018 205 207

(51) Int. Cl.
*F04C 15/06* (2006.01)
*F16H 57/04* (2010.01)
(Continued)

(52) U.S. Cl.
CPC ............ *F04C 15/06* (2013.01); *F04C 2/3446* (2013.01); *F16H 57/0436* (2013.01);
(Continued)

(58) Field of Classification Search
CPC .............................. F04C 15/06; F04C 2240/30
See application file for complete search history.

(56) References Cited

U.S. PATENT DOCUMENTS 5,290,155 A * 3/1994 Snow ...................... F04C 15/06
  417/310
9,033,681 B2  5/2015 Fannin et al.
(Continued)

FOREIGN PATENT DOCUMENTS

DE         10125259 A1   11/2002
DE      102010048786 A1    7/2011
(Continued)

OTHER PUBLICATIONS

German Search Report DE102017206576.1 dated Dec. 6, 2017. (12 pages).

*Primary Examiner* — Mary Davis
(74) *Attorney, Agent, or Firm* — Dority & Manning, P.A.

(57) ABSTRACT

A transmission device (1) has a double-flow sliding vane pump (4). Hydraulic fluid is supplied to suction sides (5A, 5B) of the pump (4) through an inlet area (14) from a hydraulic fluid reservoir (11) and from a suction loading (16) via an annular chamber (7) and pump inlets (9, 10). The annular chamber (7) is delimited by the cam ring (6) and a housing (8) enclosing the cam ring (6). A sealing gap (17) extends in the circumferential direction (U) between one of the pump inlets (10) and a circumferential area (44) of the cam ring (6) delimiting the inlet area (14) from the hydraulic fluid reservoir (11). Courses (19, 20) of the inlet area (14) and of the suction loading (16) installed in the transmission device (1) respectively form a first angle ($\alpha$) and a second angle ($\beta$) with the vertical axis (21) of the transmission device (1).

10 Claims, 3 Drawing Sheets

(51) Int. Cl.
*F04C 2/344* (2006.01)
*F16H 61/00* (2006.01)

(52) U.S. Cl.
CPC .... *F16H 61/0025* (2013.01); *F04C 2210/206* (2013.01); *F04C 2240/10* (2013.01); *F04C 2240/30* (2013.01)

(56) References Cited

U.S. PATENT DOCUMENTS

| | | |
|---|---|---|
| 9,297,453 B2 | 3/2016 | Hwang et al. |
| 2006/0068963 A1* | 3/2006 | Sugano ................ F16H 57/037 |
| | | 475/206 |
| 2008/0286123 A1 | 11/2008 | Yoshinami |
| 2015/0030472 A1 | 1/2015 | Wi |
| 2018/0023563 A1* | 1/2018 | Kumasaka .............. F04C 2/344 |
| | | 418/209 |
| 2019/0072091 A1* | 3/2019 | Maki ....................... F04C 15/06 |

FOREIGN PATENT DOCUMENTS

| | | |
|---|---|---|
| DE | 102012113102 A1 | 3/2014 |
| DE | 102013114827 A1 | 1/2015 |
| DE | 102013217819 A1 | 3/2015 |
| DE | 102015217169 A1 | 3/2017 |
| WO | WO 2015/032562 | 3/2015 |

\* cited by examiner

TRANSMISSION WITH DOUBLE-FLOW SLIDING VANE PUMP

FIELD OF THE INVENTION

The invention relates generally to a transmission device including an oil pan, a hydraulic control unit arranged in the oil pan, and an at least double-flow sliding vane pump.

BACKGROUND

A transmission device including a hydraulic control unit arranged in the area of an oil pan and including a double-flow sliding vane pump is known from practical experience. The sliding vane pump consists of a stator and a cam ring, in which a cylinder or rotor is rotatably arranged. The rotor touches the inner wall of the stator between inlet and outlet openings of the sliding vane pump. These points are the partition areas between the suction areas and the two pressure chambers of the idling vane pump.

Several radially extending guides have been recessed in the rotor. Rotary slide valves or vanes are fitted in these guides. These vanes subdivide the space between the cam ring and the rotor in the circumferential direction into multiple chambers. The rotary slide valves are movable in the guides in the radial direction of the rotor in order to compensate for the radial distance alterations between the rotor and the cam ring during a revolution. The rotary slide valves are mostly pressed against the inner wall of the cam ring by springs attached in the base of the slot-like guides. During operation of the sliding vane pump, the centrifugal force acting on the vanes amplifies the compressive force with which the vanes are pressed against the inner wall of the cam ring, by way of which a seal between the chambers is ensured.

As is known, a hydraulic fluid reservoir or an oil sump of the transmission device is provided in the oil pan, in which the hydraulic fluid is stored usually under ambient pressure, i.e., in an essentially pressure-less manner. In the installed position of the transmission device in a vehicle, the sliding vane pump is positioned above the oil pan in the housing of the transmission device. Hydraulic fluid can be supplied, directed inwardly in the radial direction, to the suction sides of the sliding vane pump, which are mutually spaced in the circumferential direction of the sliding vane pump, via an annular chamber which radially encloses the cam ring of the sliding vane pump and extends circumferentially. The annular chamber is delimited in the radial direction and in the circumferential direction of the cam ring by the cam ring and the housing of the transmission device.

During operation of the sliding vane pump, hydraulic fluid is initially sucked in from the hydraulic fluid reservoir via an inlet area by the sliding vane pump in the direction of the annular chamber. Hydraulic fluid is additionally conducted in the direction of the annular chamber via a so-called suction loading area connected to the pressure side of the sliding vane pump. The discharge pressure of the sliding vane pump is present in the suction loading area. Hydraulic fluid discharged from the sliding vane pump that is not currently required for supplying hydraulic consumers of the transmission device is returned in the direction of the two suction sides of the sliding vane pump via the suction loading area or the suction loading in order to improve the pump efficiency.

In this case, in order to avoid pressure levels on the suction sides of the sliding vane pump that are less than a threshold value, below which cavitation occurs in the sliding vane pump, the essentially pressure-less hydraulic fluid scavenged from the hydraulic fluid reservoir or the sump of the transmission device and the hydraulic fluid supplied to the sliding vane pump under discharge pressure via the suction loading is blended in the area of a defined blending path before entry into the annular chamber. For this purpose, the suction loading area opens into the inlet area upstream from the annular chamber. In the installed position of the transmission device in a vehicle, the blending path extends essentially in parallel to the vehicle vertical axis.

The first pump inlet is provided close to the mouth area of the blending path into the annular chamber or with a small gap, in the circumferential direction, from the mouth area of the blending path. In the area of the first pump inlet, a portion of the hydraulic fluid introduced into the annular chamber is guided through the cam ring or laterally past the cam ring, radially inwardly, into the first suction area of the sliding vane pump between the cam ring and the rotor and into the chambers delimited by the vanes. Proceeding from a contact area between the outer side of the rotor and the inner side of the cam ring, which is located upstream from the first pump inlet relative to the direction of rotation of the rotor, the radial distance between the outer side of the rotor and the inner side of the cam ring initially increases until a maximum of the distance is reached. In this case, hydraulic fluid is sucked in via the first pump inlet. After the maximum has been reached, the distance decreases in the circumferential direction of the cam ring up to the next contact area between the rotor and the cam ring. In this circumferential area of the sliding vane pump, the hydraulic fluid is discharged, at discharge pressure, from the chambers of the sliding vane pump, which are then connected to the pressure side.

The second pump inlet follows between the rotor and the cam ring, in the circumferential direction of the rotor and the cam ring, on the side of the second contact area facing away from the first pump inlet. The portion of the hydraulic fluid flow introduced into the annular chamber that is not conducted out of the annular chamber via the first pump inlet into the interior of the sliding vane pump is applied to the second pump inlet. The radial gap between the outer side of the rotor and the inner side of the cam ring increases constantly in the circumferential direction, proceeding from the second contact area, and therefore a suction effect sets in when the rotor is rotating. After the maximum of the radial gap has been reached, the radial gap decreases again, in the circumferential direction of the cam ring proceeding from the second contact area, as the rotor continues to rotate with respect to the cam ring, and the hydraulic fluid that was previously sucked in via the second pump inlet is discharged from the sliding vane pump again at discharge pressure while the rotor is rotating.

Moreover, the cam ring and the housing delimit a sealing gap both in the circumferential direction of the cam ring and in the radial direction, between the mouth area of the blending path into the annular chamber and the area of the annular chamber from which hydraulic fluid is introduced into the sliding vane pump via the second pump inlet. As a result, it is ensured that the hydraulic fluid supplied to the second pump inlet in the circumferential direction through the annular chamber is not guided past the second pump inlet, between the cam ring and the housing in the circumferential direction of the cam ring, and a pump capacity is not adversely affected.

In the known transmission device, the sliding vane pump is arranged in a so-called intermediate plate of the transmission device in the vehicle vertical direction above the oil pan. The intermediate plate has transfer points, via which the hydraulic fluid—which is discharged from the sliding vane pump and is subsequently distributed in a targeted manner via a hydraulic transmission control unit—can be supplied to various actuators and components of the transmission device to which hydraulic fluid is to be applied.

In this case, the sliding vane pump is also positioned in the area of the intermediate plate above the hydraulic transmission control unit which is also arranged in the oil pan. The suction loading extends away from the hydraulic transmission control unit in the direction of the blending path. The hydraulic fluid flow returned to the suction side of the sliding vane pump via the suction loading is adjusted in the area of the hydraulic transmission control unit. As a result, a sufficiently long blending path can be made available, via which the hydraulic fluid, which has been scavenged from the area of the hydraulic fluid reservoir, can be blended with the hydraulic fluid of the suction loading in such that cavitation is avoided in the area of the pump inlets of the sliding vane pump.

Newer transmission concepts increasingly include additional hybrid components in the transmission interior space above the oil pan, i.e., in particular in the area of the intermediate plate. Additional installation space in the transmission interior is required for this purpose. This additional installation space is made available only by increasing outer dimensions of a transmission in the area of the intermediate plate when the transmission pump is designed in the above-described scope and is positioned at the aforementioned point in the transmission. The installation space available in the vehicle for the arrangement of a transmission device is extremely limited, particularly in this area, however. Since the installation space available in the vehicle for the installation of a transmission device cannot be increased without considerable vehicle-related structural changes, this measure is often not accepted by the vehicle manufacturers, for cost-related reasons. Therefore, newer transmission generations, in particular hybridized transmission devices, cannot be integrated into existing vehicle systems.

In order to, nevertheless, be able to integrate hybridized transmission devices into existing vehicle systems, attempts are made to relocate the transmission pump, which is a sliding vane pump, from the area of the intermediate plate and arrange it in other areas within the transmission. An arrangement of the sliding vane pump in other areas of the interior space of a transmission is not readily possible, however. For example, vehicle manufacturers often request a defined ground clearance line of a vehicle, which is a defined distance between the lowermost point of a vehicle underside and the particular substrate on which the vehicle is traveling. For this reason, the outer dimensions of a transmission, in the installed position in the vehicle, must not fall below this ground clearance line.

Moreover, cavitation is to be avoided in the area of the sliding vane pump, in order to not adversely affect the service life of the sliding vane pump and to be able to operate the sliding vane pump at a low maintenance cost. A minimum length of the blending path is required for this purpose.

SUMMARY OF THE INVENTION

The object of the present invention is to provide a transmission device which is favorable in terms of installation space, is distinguished by a long service life and a low maintenance cost, and can be integrated into existing vehicle systems in a cost-effective way, without falling below a defined ground clearance line.

The transmission device according to the invention includes an oil pan and a hydraulic control unit arranged in the oil pan, and at least one double-flow sliding vane pump. Hydraulic fluid can be supplied to suction sides of the sliding vane pump, via an annular chamber circumferentially enclosing a cam ring of the sliding vane pump, from an inlet area connecting a hydraulic fluid reservoir in the oil pan to the annular chamber and from a suction loading of the sliding vane pump. The annular chamber is delimited by the cam ring and a housing of the transmission device enclosing the cam ring. The cam ring forms a sealing gap in some areas via its outer side in a contact area with the housing in the circumferential direction of the cam ring.

The invention includes the technical teaching that the sliding vane pump is arranged in the oil pan and, therefore, has been relocated out of the area of the intermediate plate, in which there may be only a little installation space available due to the arrangement of additional hybrid components. In addition, the sealing gap extends in the circumferential direction of the cam ring between one of the pump inlets and a circumferential area of the cam ring, which delimits an inlet area of the hydraulic fluid out of the hydraulic fluid reservoir, by which a preferably long blending path is implementable in combination with a low installation space requirement of the sliding vane pump in the interior of the transmission device. Moreover, a course of the inlet area and the course of the suction loading in the installed position of the transmission device, preferably in a vehicle, each form an angle, at least in some areas, with a vertical axis of the transmission device.

In other words, the transmission device according to the invention has both a suctioning of the hydraulic fluid out of the hydraulic fluid reservoir, which extends obliquely with respect to the vertical axis of the transmission, and a suction loading, which extends obliquely with respect to the vertical axis, proceeding from the pressure side of the sliding vane pump. As a result, a long blending path length can be made available upstream from the annular chamber without exceeding a defined ground clearance line, as compared to a suctioning out of the hydraulic fluid reservoir that extends in the vertical direction of the transmission device, and a suction loading that extends in the vertical direction. Due to the oblique courses of the suctioning and the suction loading in the area of the oil pan, use is made of installation space which is available to the required extent in the vehicle transverse direction. An installation space requirement of the transmission device is then sufficiently low in the vehicle vertical direction, despite an appropriately long blending path.

The concepts "course of the inlet area" and "course of the suction loading" are each understood to mean an extension direction—in which hydraulic fluid is guided in each case—of a substantial portion of a connecting line or a connecting duct between the hydraulic fluid reservoir in the oil sump and between the pressure side of the sliding vane pump and the suction side of the sliding vane pump. In this case, it is entirely possible that the particular connecting line or the particular connecting duct is not continuously straight and can also include curved areas. In principle, however, the objective is to fluidically design the particular course of the suctioning and also the suction loading such that the hydraulic fluid can be supplied to the sliding vane pump with preferably low flow losses.

In one advantageous refinement of the transmission device according to the invention, the sliding vane pump is arranged in the hydraulic control unit in an installation space-favorable way. As a result, the sliding vane pump and the control unit can be, with little outlay, a pre-assembled module, by way of which an assembly cost of the transmission device is reducible.

In yet another advantageous embodiment of the transmission device according to the invention, linear contact is provided in the area of the sealing gap, between the outer side of the cam ring and the housing. As a result, the width of the sealing gap between the pump inlet and the circumferential area of the cam ring, which delimits the inlet area, can be small in the circumferential direction of the cam ring and nearly the entire circumference of the sliding vane pump is usable as a blending path for blending the hydraulic fluid scavenged from the hydraulic fluid reservoir with the hydraulic fluid supplied under pressure by the suction loading. This offers the advantage that the transmission device according to the invention can have small outer dimensions while maintaining a defined ground clearance line. In addition, it is ensured that a pressure counteracting a cavitation is present in the area of each of the pump inlets of the sliding vane pump, in a structurally simple and installation space-favorable way, without increasing the outer dimensions of the housing of the transmission device.

In one installation space-favorable embodiment of the transmission device according to the invention, the angle between the course of the suction loading and the vertical axis corresponds at least approximately to the angle formed by the course of the suction area with the vertical axis.

Alternatively thereto, it is also possible that the angle between the course of the suction loading and the vertical axis is greater than the angle formed by the suction area with the vertical axis. In this way, a housing area which separates the inlet area from the suction loading and has a wall thickness required for the mode of operation of the transmission device according to the invention is achievable in a simple way in combination with a compact transmission device.

In yet another embodiment of the transmission device according to the invention, which is installation space-favorable and is manufacturable with little outlay, and is distinguished by a long service life, the oil pan includes sidewalls extending in the axial direction of the sliding vane pump and positioned opposite each other, which can be, for example, planar or essentially flat. At least one of these sidewalls has a course that forms an angle with the vertical axis of the transmission device and is higher in the vehicle vertical direction than the other sidewall.

If the angle formed by the sidewall with the vertical axis essentially corresponds to the angle between the course of the inlet area and the vertical axis, the outer dimensions of the transmission device can be limited in the vehicle transverse direction, in the area of the oil pan, to the minimum extent to be provided for achieving the required blending path length. Therefore, the transmission device according to the invention can, on the one hand, be installation space-favorable to the desired extent and, on the other hand, reliably avoid a cavitation which limits the service life.

In yet another embodiment of the transmission device according to the invention, which is operable in an essentially force-compensated way, the pump inlets are distributed on the circumference of the stator, arranged in various circumferential areas of the cam ring and essentially opposite each other.

In one embodiment of the transmission device according to the invention that is also distinguished by a long service life, the annular chamber delimited by the housing and by the stator has a flow cross-section downstream from the first pump inlet, which is matched to the flow cross-section of the first pump inlet. In this case, essentially half of the hydraulic fluid flow guided into the annular chamber via the mouth areas during operation of the transmission device flows out of the annular chamber in the direction of the first pump inlet, while the remaining hydraulic fluid flow continues to flow circumferentially in the annular chamber in the direction of the second pump inlet. In this case, the objective is to build up a back pressure in the annular chamber by the configuration of the flow cross-section of the annular chamber downstream from the first pump inlet, which facilitates the outflow of half of the hydraulic fluid flow flowing into the annular chamber upstream from the first pump inlet. This is achievable, for example, by a structurally appropriately configured throttle point of the annular chamber in the circumferential area of the annular chamber between the first pump inlet and the second pump inlet.

BRIEF DESCRIPTION OF THE DRAWINGS

Preferred embodiments of the invention are described in detail in the following drawings. All of the described features and/or features illustrated in the figures form the subject matter of the present invention individually or in any meaningful combination. Components that are the same or similar are labeled using the same reference characters. In the drawings, the following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
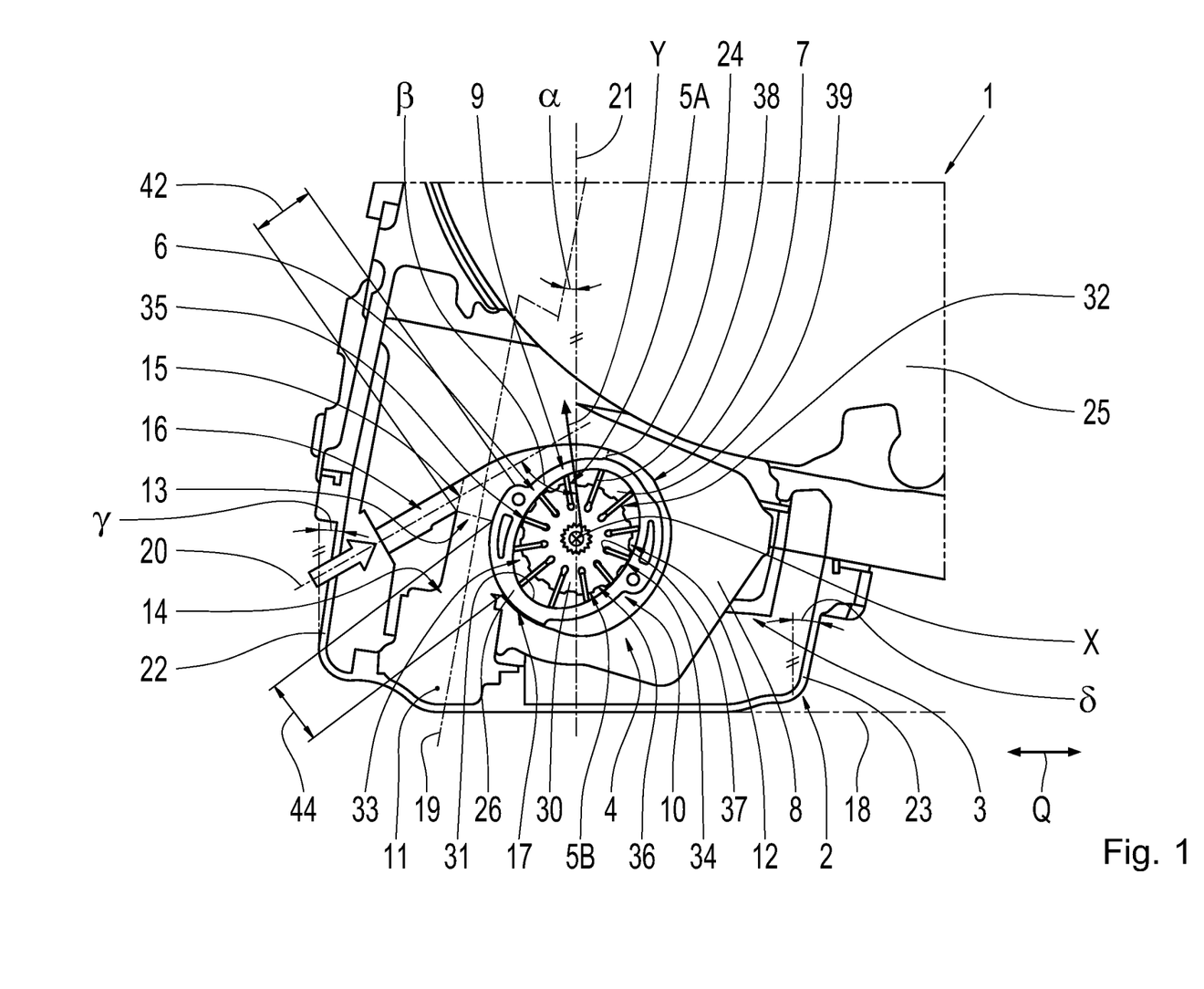
FIG. 1 shows a two-dimensional part cutaway view of a transmission device including an oil pan and a double-flow sliding vane pump arranged therein.

FIG. 1 shows a part cutaway view of a transmission device 1 which includes an oil pan 2 and a hydraulic control unit 3 arranged in the oil pan 2. The transmission device 1 can be, for example, part of a vehicle drive train of a motor vehicle including a drive machine and a driven end, via which torque is transmittable between the drive machine and the driven end. A sliding vane pump 4, which is double-flow in this case, is arranged in the area of the hydraulic control unit 3. Hydraulic fluid can be applied to the inlet or suction sides 5A, 5B of the sliding vane pump 4 via an annular chamber 7 circumferentially enclosing a cam ring 6 of the sliding vane pump 4. The annular chamber 7 is delimited in the radial direction Y of the sliding vane pump 4 by the cam ring 6 and a housing 8 of the transmission device 1 enclosing the cam ring 6 and in the axial direction X of the sliding vane pump 4 by the housing 8.

Figure 2:
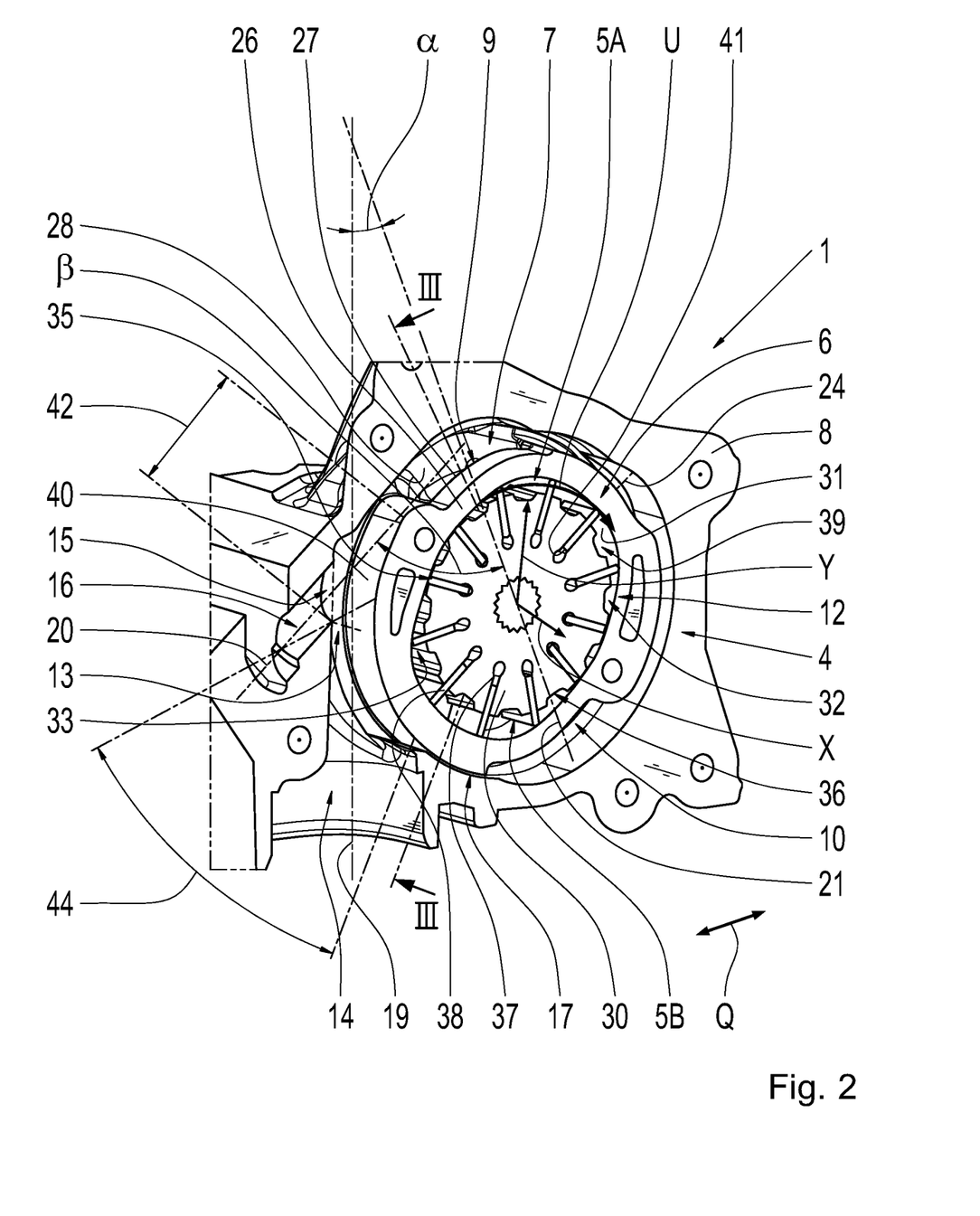
FIG. 2 shows a simplified three-dimensional cutaway view of the sliding vane pump and of the housing area of the transmission device enclosing the sliding vane pump.
Figure 3:
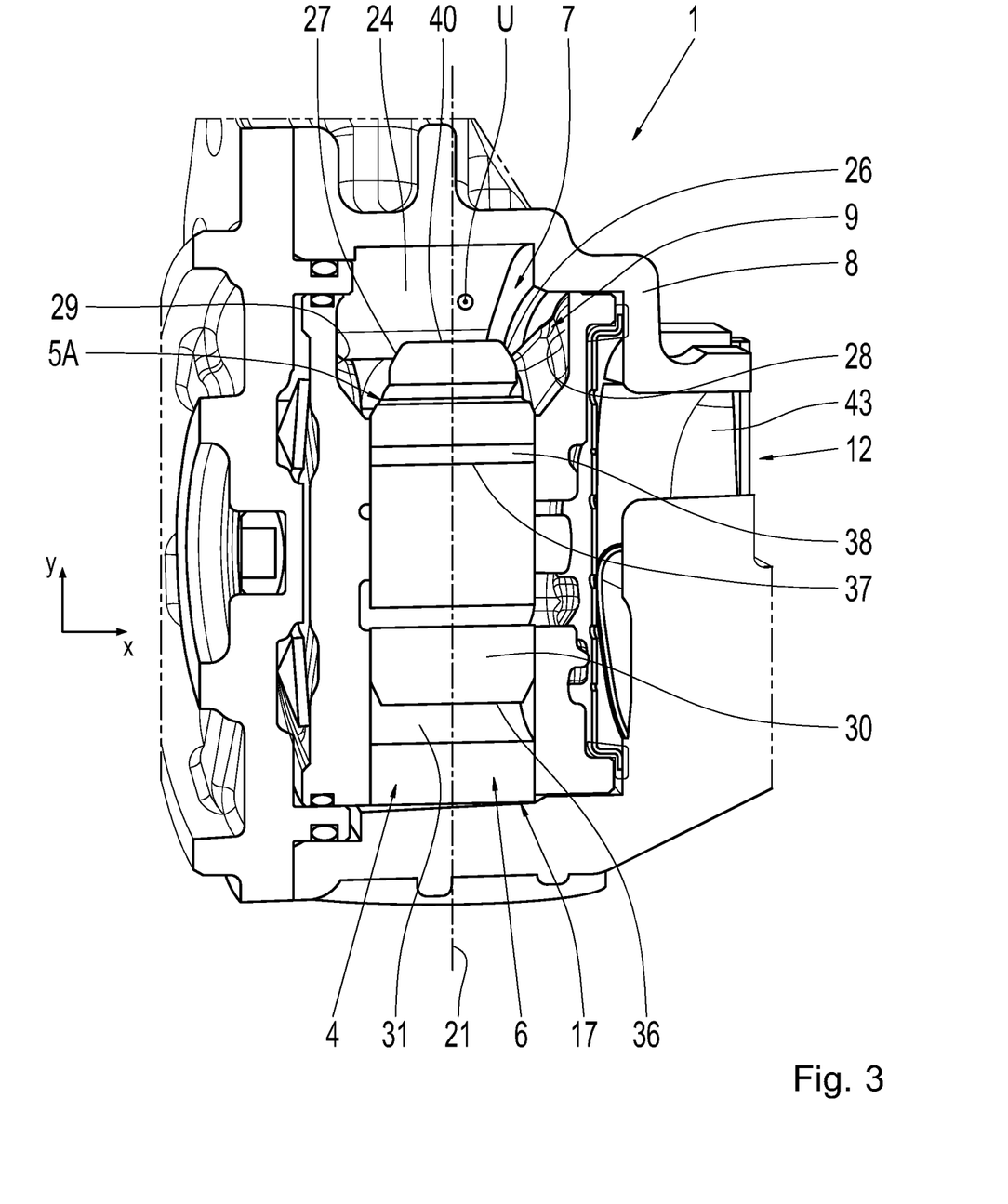
FIG. 3 shows a simplified three-dimensional cutaway view of the sliding vane pump and of the housing area of the transmission device enclosing the sliding vane pump along a line of intersection III-Ill shown in greater detail in FIG. 2.

Moreover, the cam ring 6 and the housing 8 delimit circumferentially mutually spaced pump inlets 9, 10 both in the radial direction Y and in the axial direction X in the way represented in greater detail in FIG. 2 and FIG. 3 by way of example. Through the pump inlets 9, 10, the hydraulic fluid can be guided out of the annular chamber 7 radially inwardly to the inlet sides 5A, 5B of the sliding vane pump 4. In the area of the pump inlets 9 and 10, the cam ring 6 has a smaller axial width in the axial direction X, in each case, than in the further circumferential areas of the cam ring 6. In addition, the housing 8 has a greater axial width in the area of the pump inlets 9, 10 than in the further circumferential areas of the cam ring 6. Therefore, a flow cross-section connecting the annular chamber 7 to the inlet sides 5A, 5B is formed, in each case, in the axial direction X between a face 26 of the cam ring 6 and a housing wall 28 facing the face 26 and between yet another face 27 of the cam ring 6 and a housing wall 29 facing the further face 27.

A rotor 30 is rotatably arranged in the cam ring 6. The rotor 30 touches an inner side 31 of the cam ring 6 between each of the inlet sides 5A, 5B and each of the pressure sides 32, 33 of the sliding vane pump 4. Contact areas 34, 35 between an outer side 36 of the rotor 30 and the inner side 31 of the cam ring 6 each form the partition areas between the two inlet sides 5A, 5B and the two pressure sides 32, 33 or the two pressure chambers of the sliding vane pump 4.

Several guides 37 extending in the radial direction Y have been recessed in the rotor 30. Vanes 38 or so-called rotary slide valves are fitted in these guides. These vanes 38 subdivide the annular chamber 7 between the cam ring 6 and the rotor 30 in the circumferential direction into multiple chambers 39. The vanes 38 are movable in the guides 37 in the radial direction Y of the rotor 30 to compensate for radial distance alterations between the rotor 30 and the cam ring 6 during a revolution of the rotor 30. In the present case, hydraulic pressure is applied to the vanes 38 in the guides 37 in the area of their faces 41 facing away from the inner side 31 of the cam ring 6 and the vanes are pressed against the inner wall 31 of the cam ring 6. During operation of the sliding vane pump 4, the centrifugal force acting on the vanes 38 amplifies the compressive force with which the vanes 38 are pressed against the inner wall or the inner side 31 of the cam ring 6. Therefore, a seal between the chambers 39 is ensured in the circumferential direction U of the sliding vane pump 4. The pump inlets 9 and 10 of the sliding vane pump 4 are arranged in various circumferential areas of the cam ring 6 and essentially opposite each other.

In the present case, a hydraulic fluid reservoir 11 or an oil sump of the transmission device 1 is arranged in the oil pan 2, in which hydraulic fluid is stored under ambient pressure, i.e., in an essentially pressure-less manner. In the installed position of the transmission device 1, the sliding vane pump 4 is arranged in the oil pan 2 above the oil sump 11 in the vehicle vertical direction.

During operation of the sliding vane pump 4, hydraulic fluid is initially sucked in from the oil sump 11 via an inlet area 14 by the sliding vane pump 4 in the direction of the annular chamber 7. In addition, hydraulic fluid is conducted in the direction of the annular chamber 7 via a suction loading area 16 which can be connected to the pressure sides 32, 33 in the area of the hydraulic control unit 3. The discharge pressure of the sliding vane pump 4 is present in the suction loading area 16. Hydraulic fluid discharged from the sliding vane pump 4 that is not currently required for supplying hydraulic consumers of the transmission device 1 is returned in the direction of the two inlet sides 5A, 5B of the sliding vane pump 4 via the suction loading area or the suction loading 16 in order to improve the pump efficiency.

In order to avoid pressure levels on the inlet sides 5A, 5B of the sliding vane pump 4 that are less than a threshold value, below which cavitation occurs in the sliding vane pump 4, the essentially pressure-less hydraulic fluid scavenged from the hydraulic fluid reservoir 11 or the oil sump of the transmission device 1 and the hydraulic fluid supplied to the sliding vane pump 4 under discharge pressure via the suction loading 16 is blended in the area of a defined blending path 42 before entry into the annular chamber 7. In this case, the blending path 42 extends from a mouth area 15 of the suction loading 16 into the blending path 42 and from a mouth area 13 of the inlet area 14 into the blending path 42 up to the first pump inlet 9. In addition, the two hydraulic fluid flows from the oil sump 11 and from the suction loading 16 also merge in the further course of the flow of the supplied hydraulic fluid, downstream from the blending path 42, after having entered the annular chamber 7. Therefore, the annular chamber 7 adjoining the blending path 42 is also a blending path for the two hydraulic fluid flows. The mouth area 13 of the inlet area 14 into the blending path 42 and the mouth area 15 of the suction loading into the blending path 42 are arranged upstream from the pump inlets 9 and 10 of the sliding vane pump 4.

The first pump inlet 9 adjoins the blending path 42 in the direction of flow of the hydraulic fluid from the blending path 42 into the annular chamber 7. A radial distance or a perpendicular distance between the outer side 36 of the rotor 30 and the inner side 31 of the cam ring 6 increases in the circumferential direction U proceeding from the first contact area 35 of the rotor 30 on the cam ring 6 up to a maximum. This circumferential area of the sliding vane pump 4 corresponds to the inlet side 5A, in the area of which hydraulic fluid is suctioned into the chambers 39 of the sliding vane pump 4, via the first pump inlet 9, when the rotor 30 is rotating. Proceeding from the maximum of the radial distance, the radial distance decreases in the circumferential direction U up to the next contact area 34 between the rotor 30 and the cam ring 6. In this circumferential area, which corresponds to the pressure side 32 of the sliding vane pump 4, the hydraulic fluid is discharged from the chambers 39 of the sliding vane pump 4 at discharge pressure when the rotor 30 is rotating.

The second pump inlet 10 adjoins the second contact area 34 between the rotor 30 and the cam ring 6 in the circumferential direction U of the rotor 30 and the cam ring 6. The portion of hydraulic fluid flow introduced into the annular chamber 7 that is not conducted out of the annular chamber 7 via the first pump inlet 9 is applied to the second pump inlet. The radial distance between the outer side 36 of the rotor 30 and the inner side 31 of the cam ring 6 increases again in the circumferential direction, proceeding from the contact area 34. After the maximum of the radial distance has been reached, the radial distance between the housing 8 and the cam ring 6 decreases again, in the circumferential direction U, and the hydraulic fluid, which was previously suctioned in via the second pump inlet 10, is discharged from the chambers 39 of the sliding vane pump 4 at discharge pressure. For the hydraulic fluid discharged via the pressure sides 32 and 33, the housing 8 includes an outlet opening 43 which is shown in greater detail in FIG. 3 and via which the hydraulic fluid is further conducted in the direction of the hydraulic control unit 3.

The cam ring 6 forms a sealing gap 17 between its outer side 40 and the housing 8 between the second pump inlet 10 and a circumferential area 44 of the cam ring 6. The circumferential area 44 of the cam ring 6, together with the housing 8, delimits the inlet area 14. The narrower the inlet area is between the outer side 40 of the cam ring 6 and the housing wall facing the outer side 40 of the cam ring 6, in the circumferential direction U, the longer the extension is of the annular chamber 7 in the circumferential direction U between the end of the blending path 42 and the end of the second pump inlet 10. Ideally, there is linear contact between the outer side 40 of the cam ring 6 and the inner side of the housing 8 in the area of the sealing gap 17 formed in the contact area by the outer side 40 of the cam ring 6 and the housing 8, in the axial direction X.

The more narrow the contact area or the sealing gap 17 between the outer side 40 of the cam ring 6 and the housing 8 in the circumferential direction U is, the longer the entire blending path can be—which includes the blending path 42 and the annular chamber 7.

Linear contact in the sealing gap 17 offers the possibility of arranging the pump inlet 10 in the annular chamber 7, in the circumferential direction U of the cam ring 6 and in the direction of flow of the hydraulic fluid, with the greatest possible distance from the beginning of the blending path 42 or the mouth area 15 of the suction loading 16. As a result, the entire blending path can be very long. This is advantageous cavitation in the area of the sliding vane pump 4 is avoided during the increased blending of hydraulic fluid scavenged from the hydraulic fluid reservoir 11 with hydraulic fluid made available, under pressure, from the suction loading 16.

Both a course 19 or an extension direction of the inlet area 14 and a course 20 or extension direction of the suction loading 16 form an angle α and β, respectively, with a vertical axis 21 of the transmission device 1, in the installed position of the transmission device 1. The angle β between the course 20 of the suction loading 16 and the vertical axis 21 is greater here than the angle α which is formed by the course 19 of the inlet area 14 and the vertical axis 21. Therefore, installation space not only in the vehicle vertical direction, but also in the vehicle transverse direction and, therefore, in the transverse direction Q of the transmission device 1 is utilized for designing the length of the blending path 42 and of the blending path of the annular chamber 7. The vehicle vertical direction is defined, in this case, as extending in the direction of the vertical axis 21 of the transmission device 1. Lines that are crossed by a slanted double bar, such as the vertical axis 21, extend in parallel to each other.

It is then possible to make a preferably long blending path 42 available without falling below a ground clearance line 18 of a vehicle, which has preferably been predefined by the vehicle manufacturer. The oblique loading of the sliding vane pump 4 proceeding from the suction loading 16 and the oblique suctioning of hydraulic fluid out of the inlet area 14 offers the possibility of compensating for the blending path length that has been lost in the vehicle vertical direction as compared to an arrangement of the sliding vane pump in an intermediate plate of the transmission device, by utilizing the installation space available in the vehicle vertical direction and in the vehicle transverse direction Q. This is advantageously achievable without the need to increase the outer dimensions of the transmission device 1.

The oil pan 2 includes sidewalls 22, 23 which are flat and which extend in the axial direction X and are positioned opposite each other. The sidewalls 22, 23, in turn, form an angle γ, δ, respectively, with the vertical axis 21. The sidewall 22 is higher in the vehicle vertical direction than the sidewall 23. In this case, the angles γ, δ, which are formed by the sidewalls 22 and 23, respectively, with the vertical axis 21, essentially correspond to the angle α between the course 19 of the inlet area 14 and the vertical axis 21. This oil pan 2 allows for simple and cost-effective production by a casting process, during which the oil pan is producible without a lost core.

In addition, the annular chamber 7, which is delimited by the housing 8 and by the cam ring 6, has a course of the flow cross-section 24 downstream from the first pump inlet 9, which is matched to the flow cross-sections of the first pump inlet 9. In this case, the course of the flow cross-section 24 of the annular chamber 7 downstream from the first pump inlet 9 is formed including a throttle point or a constriction. As a result, it is ensured that a back pressure builds up in the annular chamber 7 in the circumferential direction U downstream from the first pump inlet 9 during operation of the sliding vane pump 4. The back pressure causes the hydraulic fluid flow, which is guided into the annular chamber 7 via the mouth areas 13 and 15 and via the blending path 42 during operation of the transmission device 1, to flow out of the annular chamber 7, essentially by one-half, in the direction of the first pump inlet 9, while the remaining hydraulic fluid flow continues to flow circumferentially in the annular chamber 7 in the direction of the second pump inlet 10.

In the transmission device 1 according to the invention, nearly the entire circumferential area of the sliding vane pump 4, with the exception of the sealing gap 17 and the circumferential area 44 of the cam ring 6, is utilized as a blending path for blending the hydraulic fluid flows flowing into the annular chamber 7 via the loading area 16 and via the inlet area 14. As a result, a high pressure can be made available in a simple way in the area of the pump inlets 9 and 10, and therefore a cavitation in the sliding vane pump 4 is reliably avoided across its entire operating range.

In addition, a suction height of the hydraulic fluid scavenged from the hydraulic fluid reservoir 11 by the sliding vane pump 4 preferably via a filter medium is lower in the vehicle vertical direction as compared to a non-angled arrangement of the course 19 of the inlet area 14. Therefore, in the case of the transmission device 1, pressure losses in the inlet area 14 are reduced.

Moreover, the arrangement of the sliding vane pump 4 in the area of the hydraulic control unit 3 offers the advantage that the hydraulic fluid supplied to each of the inlet sides 5A, 5B of the sliding vane pump 4 is to be guided through a fewer number of interfaces, which must be sealed, between the hydraulic control unit 3 and the periphery of the hydraulic control unit 3 than is the case with an arrangement of the pump in the area of the intermediate plate 25.

Therefore, the transmission device 1 according to the invention is implementable in a structurally simpler and more cost-effective way as compared to transmission solutions in which the sliding vane pump is arranged in the area of an intermediate plate 25 shown in FIG. 1.

Modifications and variations can be made to the embodiments illustrated or described herein without departing from the scope and spirit of the invention as set forth in the appended claims.

| Reference characters | |
|---|---|
| 1 | transmission device |
| 2 | oil pan |
| 3 | hydraulic control unit |
| 4 | sliding vane pump |
| 5A, 5B | inlet sides of the sliding vane pump |

-continued

| Reference characters | |
|---|---|
| 6 | cam ring |
| 7 | annular chamber |
| 8 | housing |
| 9, 10 | pump inlet |
| 11 | hydraulic fluid reservoir, oil sump |
| 12 | pressure side of the sliding vane pump |
| 13 | mouth area of the inlet area |
| 14 | inlet area |
| 15 | mouth area of the suction loading |
| 16 | suction loading area, suction loading |
| 17 | sealing gap |
| 18 | ground clearance line |
| 19 | course of the inlet area |
| 20 | course of the loading area |
| 21 | vertical axis of the transmission device |
| 22, 23 | sidewall of the oil pan |
| 24 | flow cross-section of the annular chamber |
| 25 | intermediate plate |
| 26, 27 | face of the cam ring |
| 28, 29 | housing wall |
| 30 | rotor |
| 31 | inner side of the cam ring |
| 32, 33 | pressure side of the sliding vane pump |
| 34, 35 | contact area |
| 36 | outer side of the rotor |
| 37 | guide |
| 38 | vane |
| 39 | chamber |
| 40 | outer side of the cam ring |
| 41 | face of the vane |
| 42 | blending path |
| 43 | outlet opening |
| 44 | circumferential area of the cam ring |
| Q | transverse direction of the transmission device, vehicle transverse direction |
| U | circumferential direction |
| X | axial direction of the sliding vane pump |
| Y | radial direction of the sliding vane pump |
| α, β | angle |
| γ, δ | angle |

The invention claimed is:

1. A transmission (1), comprising:
an oil pan (2);
a hydraulic control unit (3) arranged in the oil pan (2); and
a double-flow sliding vane pump (4) arranged in the oil pan (2), the sliding vane pump (4) comprising:
a housing (8) defining an inlet area (14) and a suction loading area (16);
a cam ring (6) positioned within the housing (8), the cam ring (6) delimiting pump inlets (9, 10);
a rotor (30) positioned within the cam ring (6), the rotor (30) delimiting suction sides (5A, 5B) and pressure sides (32, 33) of the sliding vane pump (4); and
an annular chamber (7) defined between the cam ring (6) and the housing (8),
wherein hydraulic fluid is suppliable to the annular chamber (7) from a hydraulic fluid reservoir (11) via the inlet area (14) and from the pressure sides (32, 33) via the suction loading area (16),
wherein the hydraulic fluid within the annular chamber (7) is suppliable to the suction sides (5A, 5B) via the pump inlets (9,10),
wherein an outer side (40) of the cam ring (6) contacts the housing (8) at a contact area (17) that extends along a circumferential direction (U) of the cam ring (6) between one of the pump inlets (10) and a circumferential area (44) of the cam ring (6), the circumferential area (44) positioned at the inlet area (14),
wherein the inlet area (14), the suction loading area (16), and the annular chamber (7) are coplanar in an axial plane that is perpendicular to an axial direction (X),
wherein, in an installed position of the transmission (1), a course (19) of the inlet area (14) is at a first angle (α) in the axial plane relative to a vertical axis (21) and a course (20) of the suction loading area (16) is at a second angle (13) in the axial plane relative to the vertical axis (21).

2. The transmission of claim 1, wherein the sliding vane pump (4) is arranged in the hydraulic control unit (3).

3. The transmission as claimed in claim 1, wherein the outer side (40) of the cam ring (6) linearly contacts the housing (8) in the axial direction (X) proximate the contact area (17).

4. The transmission of claim 1, wherein the second angle (β) between the course (20) of the suction loading (16) and the vertical axis (21) corresponds to the first angle (a) formed by the course (19) of the inlet area (14) with the vertical axis (21).

5. The transmission of claim 1, wherein the oil pan (2) comprises two sidewalls (22, 23) extending essentially parallel to the axial direction (X) of the sliding vane pump (4) and positioned opposite each other, wherein one of the two sidewalls (22, 23) forms an angle (γ, δ) with the vertical axis (21) and is positioned higher along the vertical axis (21) than the other of the two sidewalls (22, 23).

6. The transmission of claim 5, wherein the angle (γ, δ) formed by the one sidewall (22, 23) with the vertical axis (21) corresponds to the first angle (α) between the course of the inlet area (14) and the vertical axis (21).

7. The transmission of claim 1, wherein the pump inlets (9, 10) are distributed on a circumference of the cam ring (6) such that the pump inlets (9, 10) are positioned opposite each other on the circumference of the cam ring (6).

8. The transmission of claim 1, wherein a flow cross-section (24) of the annular chamber (7) downstream from a first pump inlet (9) of the pump inlets is equal to a flow cross-section of the first pump inlet (9) such that half of the hydraulic fluid flow guided in the annular chamber (7) during operation of the transmission (1) flows out of the annular chamber (7) in the direction of the first pump inlet (9), while the remaining hydraulic fluid flow continues to flow circumferentially in the annular chamber (7) towards a second pump inlet (10) of the pump inlets.

9. The transmission of claim 1, wherein the hydraulic fluid suppliable to the annular chamber (7) from a hydraulic fluid reservoir (11) via the inlet area (14) and from the pressure sides (32, 33) via the suction loading area (16) are mixed in a blending path area (42) defined between a mouth area (15) of the suction loading area (16), a mouth area (13) of the inlet area (14), and a first pump inlet (9) of the pump inlets (9, 10) before being supplied to the annular chamber (7), the blending path area (42) being coplanar in the axial plane with the inlet area (14), the suction loading area (16), and the annular chamber (7).

10. A transmission (1), comprising:
an oil pan (2);
a hydraulic control unit (3) arranged in the oil pan (2); and
a double-flow sliding vane pump (4) arranged in the oil pan (2), the sliding vane pump (4) comprising:
a housing (8) defining an inlet area (14) and a suction loading area (16);
a cam ring (6) positioned within the housing (8), the cam ring (6) delimiting pump inlets (9, 10);

a rotor (30) positioned within the cam ring (6), the rotor (30) delimiting suction sides (5A, 5B) and pressure sides (32, 33) of the sliding vane pump (4); and an annular chamber (7) defined between the cam ring (6) and the housing (8), wherein hydraulic fluid is suppliable to the annular chamber (7) from a hydraulic fluid reservoir (11) via the inlet area (14) and from the pressure sides (32, 33) via the suction loading area (16), wherein the hydraulic fluid within the annular chamber (7) is suppliable to the suction sides (5A, 5B) via the pump inlets (9, 10), wherein an outer side (40) of the cam ring (6) contacts the housing (8) at a contact area (17) that extends along a circumferential direction (U) of the cam ring (6) between one of the pump inlets (10) and a circumferential area (44) of the cam ring (6), the circumferential area (44) positioned at the inlet area (14), and wherein, in an installed position of the transmission (1), a course (19) of the inlet area (14) is at a first angle (a) relative to a vertical axis (21) and a course (20) of the suction loading area (16) is at a second angle (β) relative to the vertical axis (21);

wherein the oil pan (2) comprises two sidewalls (22, 23) extending essentially parallel to an axial direction (X) of the sliding vane pump (4) and positioned opposite each other, wherein one of the two sidewalls (22, 23) forms an angle (γ, σ) with the vertical axis (21) and is positioned higher along the vertical axis (21) than the other of the two sidewalls (22, 23), the angle (γ, δ) formed by the one sidewall (22, 23) with the vertical axis (21) corresponding to the first angle (a) between the course of the inlet area (14) and the vertical axis (21).

* * * * *